(12) United States Patent
Marks et al.

(10) Patent No.: US 7,759,664 B2
(45) Date of Patent: Jul. 20, 2010

(54) SOLAR HEAT POWERED DEPLOYABLE STRUCTURE

(75) Inventors: Geoffrey William Marks, Santa Barbara, CA (US); James Trevor Renshall, Moorpark, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 794 days.

(21) Appl. No.: 11/650,380

(22) Filed: Jan. 5, 2007

(65) Prior Publication Data

US 2008/0164428 A1    Jul. 10, 2008

(51) Int. Cl.
*B64G 1/44* (2006.01)
*B64G 1/54* (2006.01)
*G21F 3/00* (2006.01)

(52) U.S. Cl. .............. 250/505.1; 250/515.1; 250/517.1; 250/519.1; 244/159.4; 244/171.8

(58) Field of Classification Search .............. 250/505.1, 250/515.1, 517.1, 519, 519.1; 244/158.1, 244/158.2, 171.1, 171.8, 158.4, 158.8, 158.9, 244/159.5, 159.4, 171.7, 172.6, 172.7, 123.1, 244/123.11, 123.12, 123.13, 123.14

See application file for complete search history.

(56) References Cited

U.S. PATENT DOCUMENTS

| | | | | |
|---|---|---|---|---|
| 3,241,142 A | * | 3/1966 | Raabe | 342/355 |
| 4,756,493 A | * | 7/1988 | Camaret | 244/171.8 |
| 2002/0104927 A1 | * | 8/2002 | Pedreiro | 244/158 R |
| 2003/0010870 A1 | * | 1/2003 | Chafer | 244/172 |
| 2007/0150064 A1 | * | 6/2007 | Ruberte et al. | 623/17.16 |
| 2007/0278351 A1 | * | 12/2007 | Massonnet | 244/164 |
| 2008/0180802 A1 | * | 7/2008 | Cash | 359/601 |
| 2009/0075091 A1 | * | 3/2009 | Defoort et al. | 428/426 |

OTHER PUBLICATIONS

W. Cash, "Detection of Earth-like planets around nearby starts using a petal-shaped occulter", Nature, Jul. 6, 2006, vol. 442, No. 7098, pp. 51-53.*

* cited by examiner

*Primary Examiner*—Jack I Berman
*Assistant Examiner*—Nicole Ippolito Rausch
(74) *Attorney, Agent, or Firm*—Carmen Patti Law Group, LLC

(57) ABSTRACT

An embodiment of the present method may comprise: heating up at least one structural element beyond a change state temperature thereof; changing the configuration of the structural element from an extended configuration to a reduced size configuration; cooling the structural element to below the change state temperature thereof; covering the structural element with a thermal protection device; removing the thermal protection device to expose the structural element to heat radiation; and heating, via the heat radiation, at least a portion of the structural element to thereby cause the structural element to change from the reduced size configuration to the extended configuration. In one embodiment each of the structural elements is formed from a thin elastic memory composite material.

21 Claims, 3 Drawing Sheets

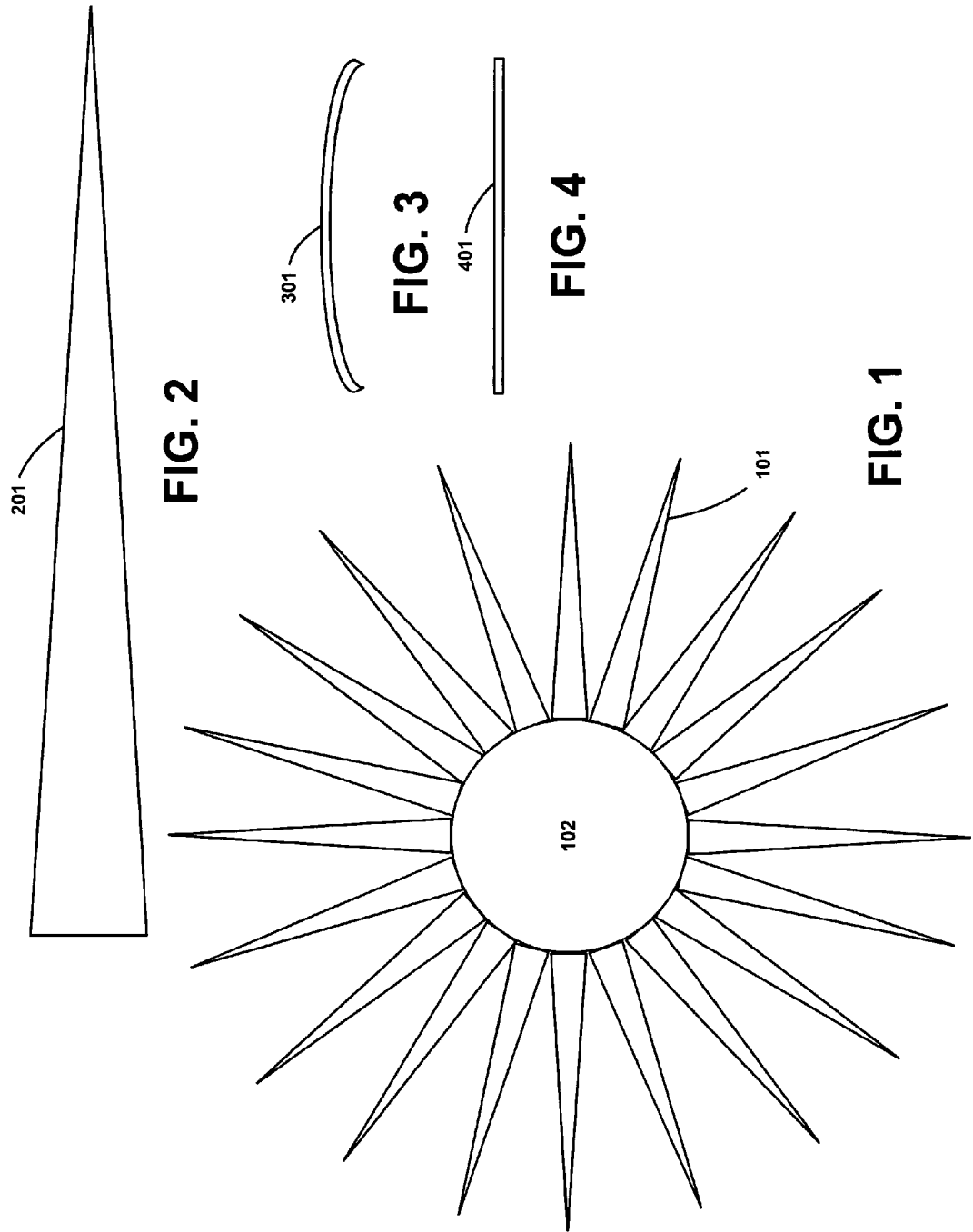

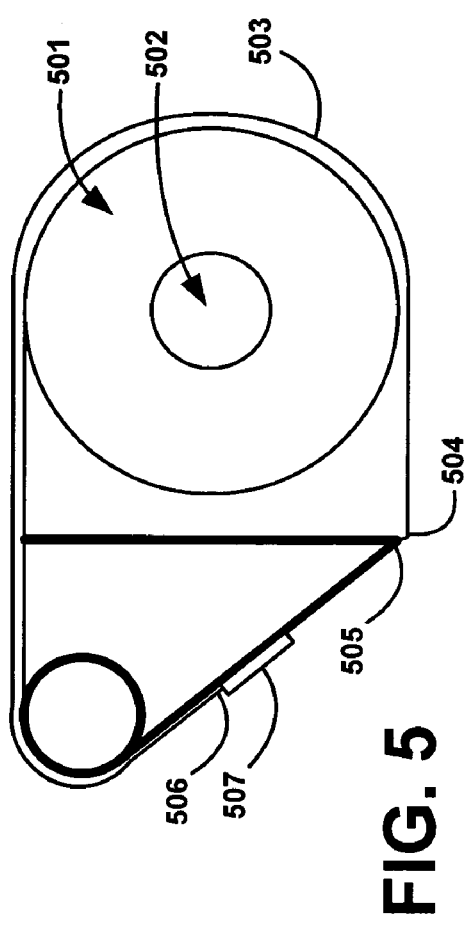
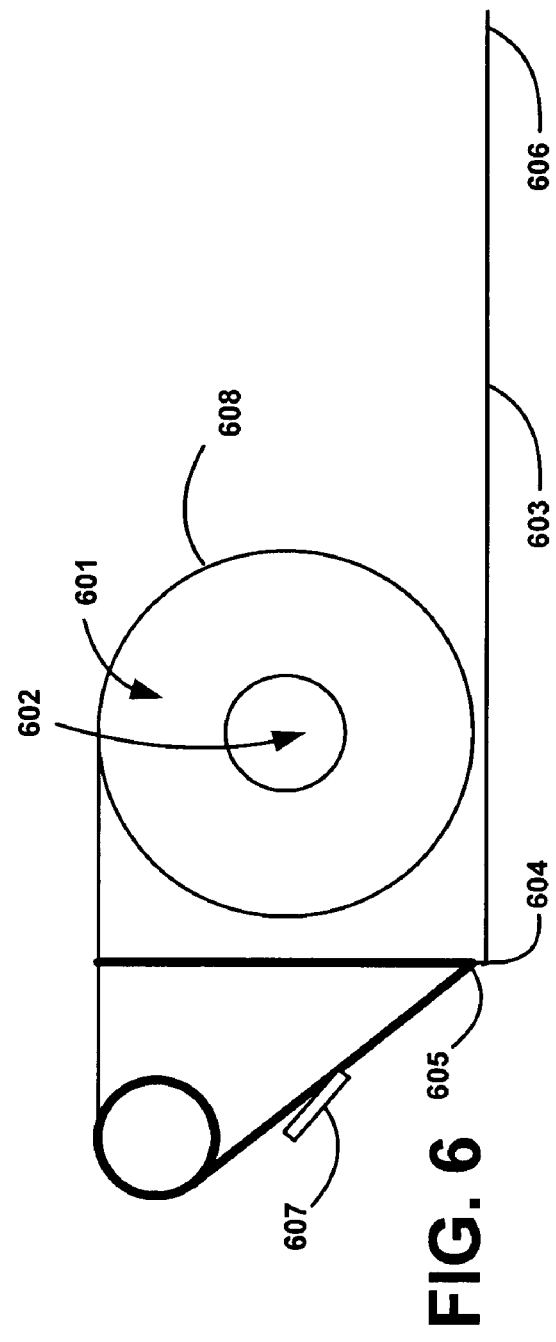

SOLAR HEAT POWERED DEPLOYABLE STRUCTURE

TECHNICAL FIELD

The invention relates generally to elastic memory composite structures and, more specifically, occulters that utilize elastic memory composite structures.

BACKGROUND

Currently, the direct detection of extrasolar planets (or exoplanets) is extremely difficult. This is primarily because exoplanets appear extremely close to their host stars when observed at astronomical distances. Also, exoplanets are incredibly dim compared to their host stars. Typically, the star will be approximately a billion times brighter than the orbiting planet. This makes it near-impossible to see planets against the star's glare. The difficulty of observing such a dim planet so close to a bright star is the obstacle that has prevented astronomers from directly photographing exoplanets.

It has been proposed to use an occulter to overcome the difficulty of distinguishing a planet in the glare of a bright star. The occulter would block all of the starlight from reaching the observing, while allowing the planet's light to pass undisturbed. This would allow the direct observation of orbiting planets.

The occulter may be a large sheet disc flown thousands of kilometers along the line of sight. The disc would likely be several tens of meters in diameter. One difficulty with this concept is that light incoming from the target star would diffract around the disc and constructively interfere along the central axis. Thus the starlight would still be easily visible, making planet detection impossible. Fortunately this effect can be negated be specifically shaping the occulter. By adding specially shaped petals to the outer edge of the disc, the starlight will disappear, allowing the suppression of the star's light. However, it is a drawback of the prior art that such structures are too large to be launched into space.

Thus, there is a need in the art for an improved structure that may be deployed after it launched into space.

SUMMARY

One embodiment of the present method and apparatus encompasses an apparatus. The apparatus may have: at least one heat radiation activated deployable structure; and a heat shield assembly that shields the deployable structure in a first position and that exposes the deployable structure to heat radiation in a second position.

Another embodiment of the present method and apparatus encompasses a method. The method may comprise: heating up at least one structural element beyond a change state temperature thereof; changing the configuration of the structural element from an extended configuration to a reduced size configuration; cooling the structural element to below the change state temperature thereof; covering the structural element with a thermal protection device; removing the thermal protection device to expose the structural element to heat radiation; and heating, via the heat radiation, at least a portion of the structural element to thereby cause the structural element to change from the reduced size configuration to the extended configuration.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

FIG. 1 depicts a star shade according to the present method and apparatus.

FIG. 2 is a side view of a petal that has a tapered configuration.

FIG. 3 depicts a petal formed of the elastic memory composite material that has a curved shape across its width to provide a degree of structural stability.

FIG. 4 depicts a petal formed of the elastic memory composite material that has a flat shape across its width.

FIG. 5 depicts an embodiment in which a structural element is in a compact configuration and protected by a thermal protection device.

FIG. 6 depicts an embodiment in which a structural element is in a compact configuration, but is no longer protected by the thermal protection device.

DETAILED DESCRIPTION

Figures 7, 8, 9, 10:
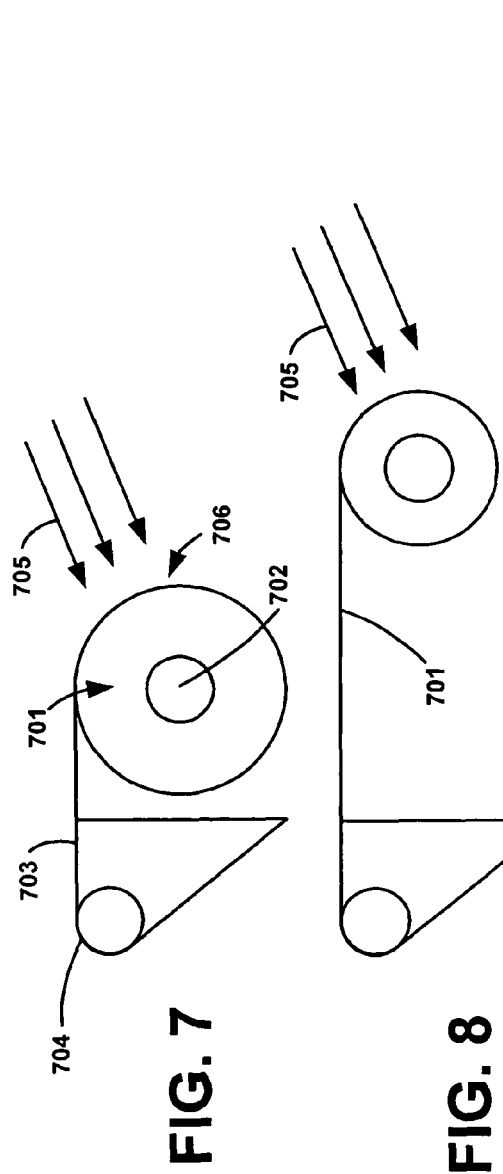
FIGS. 7-10 depict a deployment of a structural element.

In order to prevent the incredibly bright star from overwhelming a planet's much dimmer light, the starlight may be blocked with an occulter. An occulter is simply an object that prevents light from another object from reaching the observer. For example, during a solar eclipse, the moon occults the sun. By making a large enough disc and launching it into space any star's light may be blocked out, allowing the planets around the star to be viewed.

The basic concept for this design is reasonably simple. However there are details that must be considered with this idea. The most challenging obstacle is caused by diffraction. Diffraction is the bending of waves around a corner. Thus the starlight hitting the edge of the occulting disc will diffract around the edge and still be visible, defeating the purpose of the occulter.

When two waves of light meet, they interfere with each other. If the two waves are "in phase" (i.e. their crests and troughs line up) then the waves interfere constructively. This means that the two waves add together to create a bright spot. If the two waves are out of phase (the crests of one wave line up with the troughs of another), then they combine destructively. This means that the two waves effectively cancel each other out, leaving a dark spot.

If one were to use the disc shaped occulter and stand behind it, one would see a bright ring around the edge. Because the light traveling around the disc all travels the same length to reach one's eyeball, they are all in phase with each other, thus they constructively interfere.

Fortunately, by specially designing the occulting disc, the constructive diffraction may be eliminated. By adding petals onto the disc's edge, the path length of each ray of light is offset just enough so that the combined effect is destructive interference. As the light waves diffract around the petals, each ray of light will destructively interfere with another ray, therefore no light will be seen if one stands behind the starshade. The shadow created behind the occulter will be large enough to fly a space telescope within. By flying in the starshade's shadow, the telescope will be able to look for the faint planet-light without being blinded by the star's light. However, an actual shade would be too large to launch into space as is (a few tens of meters). Therefore it would have to be launch folded up inside a rocket and be unfolded in space.

In general, embodiments according to the present method and apparatus may be used for a variety of purposes, such as deployable star shades, long antennas, or other structures that must be stored in a compact configuration and them extended to a predetermined configuration. In order for the structure to change shape a thin elastic memory composite (EMC) material may be used.

EMC materials are similar to traditional fiber-reinforced composites except for the use of an elastic memory thermoset resin-matrix. The elastic memory matrix is a fully cured polymer, which can be combined with a wide variety of fiber and particulate reinforcements and fillers. The unique properties of the matrix enable EMC materials to achieve high packaging strains without damage. Strains are induced by elevating the temperature of the EMC material and then applying a mechanical force. The shape memory characteristics enable the high packaging strains to be "frozen" into the EMC by cooling. Deployment (i.e., shape recovery) is effected by elevating the temperature. The temperature at which these operations occur is adjustable.

At lower temperatures, the performance of EMC materials follows classical composite laminate theory. At higher temperatures, EMCs exhibit dramatically reduced stiffnesses due to significant matrix softening of the resin. Adequately addressing the mechanics of the "soft-resin" will enable the EMC materials to provide repeatable stowage and deployment performance without damage and or performance changes. Products fabricated from these materials can be deformed and reformed repeatedly. Products utilizing EMC materials can be fabricated with conventional composite fabrication processes and tooling.

FIG. 1 depicts a star shade according to the present method and apparatus. The star shade embodiment may, for example, have a plurality of petals 101 or, in general, structural elements that are operatively coupled to a base structure 102. It is to be understood that the star shade may have more or less than the number of petals 101 depicted in FIG. 1.

FIG. 2 is a side view of a petal 201 that has a tapered configuration. In this embodiment the structural elements 201 or membranes may be approximately 25 meters long and may taper to a point. The structural element 201 may, for example, be formed from a thin (approximately 0.15 inches thick) elastic memory composite material.

FIG. 3 depicts a petal 301 formed of the elastic memory composite material that has a curved shape across its width to provide a degree of structural stability.

FIG. 4 depicts a petal 401 formed of the elastic memory composite material that has a flat shape across its width. Other cross sectional shapes and structural shapes in general are within the embodiments of the present method and apparatus.

FIG. 5 depicts an embodiment in which a structural element is in a compact configuration and protected by a thermal protection device. For storage the structural element 501 may be heated up beyond its change state temperature and then rolled onto a mandrel 502, The structural element 501 may be covered by a thermal protection device 503 during, for example, a launch phase when a device, such as a star shade, is to be utilized in space.

A first end 504 of the thermal protection device 503 may be permanently attached to a base 505. A second end 506 of the thermal protection device 503 may be releaseably attached to the base 505 by a latch 507. The thermal protection device 503 may be made of a variety of materials, such as spring steel.

FIG. 6 depicts an embodiment in which a structural element is in a compact configuration, but is no longer protected by the thermal protection device. When in position for deployment, the thermal protection device 603 may be removed or withdrawn by releasing the latch 607. In the depicted embodiment the second end 606 of the thermal protection device 603 has been released and the first end 604 is still attached to the body 605. With the thermal protection device 603 in an open position, the sun would warm an outside area 608 of the roll of the structural element 601 causing the structural element 601 to return to its original shape. As the structural element 601 straightens out more of the roll of the structural element 601 is revealed causing further deployment until the entire structural element 601 is deployed.

FIGS. 7-10 depict a deployment of a structural element. FIG. 7 shows a structural element 701 that has been rolled onto a mandrel 702. A first end 703 of the structural element 701 is attached to a body 704. Heat radiation 705, such as from the sun, is absorbed in an area 706 of the structural element 701 causing the structural element 701 to return to its original shape.

FIGS. 8, 9 and 10 show the structural element 701 in various stages as the structural element 701 unrolls. Finally, in FIG. 10 the structural element 701 is completely unrolled.

It is to be understood that embodiments of the present method and apparatus may have a variety of different shapes and configurations, and may be formed from a variety of different materials. Depending upon the application, there may be one or a plurality of structural elements. Also, the plurality of structural elements may be arranged indifferent configurations relative to one another depending upon the application.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. An apparatus, comprising: at least one heat radiation activated deployable structure; and a heat shield assembly that shields the deployable structure in a first position and that exposes the deployable structure to heat radiation in a second position.

2. The apparatus according to claim 1, wherein the heat radiation activated deployable structure is a solar radiation activated deployable structure.

3. The apparatus according to claim 1, wherein the heat radiation activated deployable structure has a base, and wherein the heat radiation activated deployable structure has a plurality of petals, each of the petals of the plurality of petals having a first end operatively coupled to the base.

4. The apparatus according to claim 3, wherein the petals are in a reduced size configuration in a first shielded position and in an extended configuration in a second exposed position.

5. The apparatus according to claim 4, wherein the petals in the first shielded position are shielded from heat radiation and in the second exposed position absorb heat radiation.

6. An apparatus, comprising: a plurality of structural elements that are operatively coupled to a base structure; and a heat shield assembly that shields the structural elements in a first position and that exposes the structural elements to heat radiation in a second position.

7. The apparatus according to claim 6, wherein the structural elements are petals, and wherein the petals and base structure form a star shade.

8. The apparatus according to claim 7, wherein the petals are in a reduced size configuration in a first shielded position and in an extended configuration in a second exposed position.

9. The apparatus according to claim 8, wherein the petals in the first shielded position are shielded from heat radiation and in the second exposed position absorb heat radiation.

10. The apparatus according to claim 7, wherein each of the petals are approximately 25 meters long and may taper to a point in an extended configuration.

11. The apparatus according to claim 7, wherein each of the petals is approximately 0.15 inches thick.

12. The apparatus according to claim 7, wherein each of the petals has a curved shape across a width thereof to provide a degree of structural stability.

13. The apparatus according to claim 6, wherein each of the structural elements is formed from a thin elastic memory composite material.

14. A method, comprising: heating up at least one structural element beyond a change state temperature thereof; changing the configuration of the structural element from an extended configuration to a reduced size configuration; cooling the structural element to below the change state temperature thereof; and covering the structural element with a thermal protection device; removing the thermal protection device to expose the structural element to heat radiation; and heating, via the heat radiation, at least a portion of the structural element to thereby cause the structural element to change from the reduced size configuration to the extended configuration.

15. The method according to claim 14, wherein the step of changing the configuration of the structural element from an extended configuration to a reduced size configuration comprises rolling the structural element onto a mandrel.

16. The method according to claim 15, wherein the step of heating, via the heat radiation, at least a portion of the structural element to thereby cause the structural element to change from the reduced size configuration to the extended configuration comprises successively heating different areas of the structural element such that the structural element unrolls from the mandrel.

17. The method according to claim 14, wherein the structural element in a first shielded position is shielded from heat radiation by the thermal protection device and in a second exposed position, by at least partial removal of the thermal protection device, absorbs heat radiation.

18. The method according to claim 14, wherein the structural elements are petals, and wherein the petals are attached to a base structure and form a star shade in the extended configuration.

19. The method according to claim 18, wherein each of the petals is approximately 0.15 inches thick.

20. The method according to claim 18, wherein each of the petals has a curved shape across a width thereof to provide a degree of structural stability.

21. An apparatus comprising:
a heat activation deployable structure formed of a material having the properties of an Elastic Memory Matrix (EMC) material; and
a heat shield assembly adapted and constructed to shield the heat activation deployable structure in a first position and to expose the heat activation deployable structure to heat radiation in a second position, wherein the heat activation deployable structure is deployably and selectively connected to the heat shield assembly.

* * * * *